United States Patent [19]

Martin et al.

[11] 3,852,438

[45] Dec. 3, 1974

[54] PESTICIDAL COMPOSITIONS CONTAINING 1-HALO-2-ARYLOXY-VINYL-(2)-PHOSPHATES

[75] Inventors: Henry Martin; Jozef Drabek, both of Basel, Switzerland

[73] Assignee: Ciba Limited, Basel, Switzerland

[22] Filed: Feb. 14, 1973

[21] Appl. No.: 332,470

Related U.S. Application Data

[62] Division of Ser. No. 64,648, Aug. 17, 1970, Pat. No. 3,732,343.

[30] Foreign Application Priority Data

Aug. 18, 1969 Switzerland.................... 12553/69
Sept. 25, 1969 Switzerland.................... 14452/69

[52] U.S. Cl.................. 424/217, 424/210, 424/214, 424/212, 424/215, 424/218

[51] Int. Cl............................................. A01n 9/36

[58] Field of Search ........... 424/210, 212, 214, 215, 424/217, 218

[56] References Cited

UNITED STATES PATENTS

| | | | |
|---|---|---|---|
| 2,861,914 | 11/1958 | Sailmann | 260/951 |
| 3,632,692 | 1/1972 | Morales | 424/210 |
| 3,732,343 | 5/1973 | Martin et al. | 424/210 |

*Primary Examiner*—Vincent D. Turner
*Attorney, Agent, or Firm*—Harry Falber; Frederick H. Rabin

[57] ABSTRACT

1-Halo-2-aryloxy-vinyl(2)-phosphates are very effective compounds for combating pests, such as insects, nematodes and representatives of the order Acarina as well as plant-pathogenic bacteria and fungi. The new phosphates may be used in the form of pesticidal preparations.

21 Claims, No Drawings

PESTICIDAL COMPOSITIONS CONTAINING 1-HALO-2-ARYLOXY-VINYL-(2)-PHOSPHATES

This is a division of application Ser. No. 64,648, filed on Aug. 17, 1970, now U.S. Pat. No. 3,732,343.

This invention relates to phosphoric acid esters having pesticidal properties, and to a process for their preparation.

The present invention provides compounds having the formula

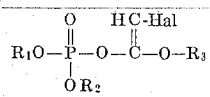

in which Hal represents a bromine atom or a chlorine atom, $R_1$ and $R_2$, which may be the same or different, each represents an alkyl radical having from 1 to 4 carbon atoms and $R_3$ represents an aryl radical, especially a phenyl or naphthyl radical, which may be substituted by a halogen atom, an alkyl radical having from 1 to 4 carbon atoms, an alkoxy radical having from 1 to 4 carbon atoms, an alkylthio radical having from 1 to 4 carbon atoms, an alkylsulphinyl or alkylsulphonyl radical having from 1 to 4 carbon atoms, $-NO_2$, $-CF_3$, $-CN$, $-SCN$, a $-COOalkyl$ radical, the alkyl moiety of which has from 1 to 4 carbon atoms or a $-COalkyl$ radical, the alkyl moiety of which has from 1 to 4 carbon atoms. The term halogen as used herein encompasses fluorine, chlorine, bromine and iodine.

Preferred compounds are those having the formula I, in which Hal represents a chlorine atom or a bromine atom, $R_1$ and $R_2$ each represents a methyl or ethyl radical and $R_3$ represents a phenyl group which may be substituted by one or more of the following substituents:

halogen, methyl, ethyl, methoxy, ethoxy, methylmercapto, methylsulphinyl, methylsulphonyl, $-NO_2$, $-CF_3$, $-CN$, $-SCN$, carbethoxy, carbomethoxy, acetyl or propionyl. The compounds which are especially preferred are those in which Hal represents a chlorine atom and $R_3$ represents a phenyl group substituted by one or more of the following substituents:

clorine, bromine, iodine, $-CN$ $-NO_2$ or $-CF_3$, and which can additionally also contain a methyl or ethyl group.

The phosphoric acid esters of the formula I are, for example, active against insects, nematodes and representatives of the order Acarina, and also against plant-pathogenic bacteria and fungi. When used in appropriately greater amounts, they also show herbicidal and defoliating action.

Their main field of use is combatting all stages of development of sucking and biting insects and Acarina, that is to say, of eggs, larvae, pupae, chrysales and adults or imagines.

The sucking insects include Diptera and Hymenoptera, for example, aphids (Aphidae) such as *Myzus persicae, Doralis fabae, Rhopalosiphum padi, Macrosiphum pisi, Macrosiphum solanifolii, Cryptomyzus korschelti, Sappaphis mali, Hyalopterus arundinis* and *Myzus cerasi*, shield lice and woolly lice (Coccina), for example, *Aspidiotus hederae, Lecanium hesperidum Pseudococcus maritimus*, and varieties of Thrips (*Thysanoptera*), for example, *Hercinothrips femoralis*, bugs, for example, *Piesma quadrata, Rhondnius prolixus* and *Triatoma infestans*, and cicadas, for example, *Euscelis bilobatus* or *Nephotettix bipunctatus*.

Amongst the biting insects, there should be mentioned *Lepidoptera* and *Coleoptera*, for example *Plutella maculipennis, Lymantria dispar, Euproctis chrysorrhoea, Malocosoma neustria, Mamestra brassicae, Agrotis segetum, Pieris brassicae* and *Prodenia litura, Ephestia kuhniella*, and *Galleria mellonella*, as well as storage pests, for example, *Dermestes frischii, Trogoderma granarius, Tribolium castaneum, Calandra* and *Sitophilus* zea mais, *Stegobium paniceum, Tenebrio molitor, Oryzaephilus surinamensis, Blattela germanica, Periplaneta americana, Blatta orientalis, Blaberus gigantus, Blaberus fuscus, Gryllus domesticus*, Sitophilus granarius and *Leptinotarsa decemlineata;* varieties which inhabit the soil, for example, *Agriotes* sp. and *Melolontha melontha;* and termites, for example, *Leucotermes* sp. or *Leucotermes flavipes*.

A substantial number of pests is to be found under the order Acarina, for example mites and amongst these especially spider mites (Tetranychidae) for example *Tetranychus telarius, T. althaeae, T. urticae, Paratetranychus pilosus* and *Panonychus ulmi*, and gall mites (*Eriophyes ribis*) and Tarsonemidae, for example, *Hemitarsomenus latus* or *Tassonemus pallidus*.

The order Acarina however also includes the ticks, that is to say, ectoparasites such as *Boophilus microplus, Dermanyssus gallinae, Ornithonyssus bacoti, Ornithonyssus sylviarum, Rhipicephalus bursa, Penumonyssus caninum, Laelaps nutalli, Acarapis woodi* and *Psorergates ovis*.

This summary of pests does not in any way claim to be complete. Fundamentally, the phosphates of the formula I have a powerful action against insects and Acarina which are known as pests in crop plant cultures. Thus, say, the rice stem borer *Chilo suppressalis* is completely destroyed by 0.02 percent of the compounds of the present invention.

Apart from the insecticidal and acaricidal action, the compounds of the formula I also show a powerful action against plant-pathogenic nematodes, of which the following orders may be mentioned:

Aphelenchoides, for example, *Aphelenchust ritzemabosi, Aphelenchus fragariae*, and *Aphelenchus oryzae*, Ditylenchoides, for example *Ditylenchus dipsaci*, Meloidogyne, for example *Meloidogyne arenaria* and *Meloidogyne incognita*, and cyst-froming nematodes (*Heterodera*), for example, *Heterodera rostochienis*, and *Heterodera schachtii*, and root nematodes such as *Pratylenchus, Paratylenchus, Rotylenchus, Xiphinema* and *Rahadorpholus*.

The present invention also provides pesticidal preparations which comprise, as active ingredient, at least one phosphoric acid ester of the formula

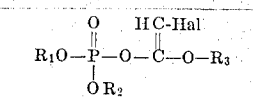

in which Hal, $R_1$, $R_2$ and $R_3$ have the meanings specified above, together with a suitable carrier, for example, a solvent, diluent, dispersing agent, emulsifier, adhesive, thickener, or binder and, if desired other pesticides, for example, insecticides, acaricides, nematocides, bactericides and fungicides.

The active ingredients can be used in the most diverse manner, for example, in the form of sprays, concentrates, dusting powders, scattering agents, granules, fly plates or impregnated strips.

In order to manufacture directly sprayable solutions of the compounds of the formula (I) it is for example possible to use mineral oil fractions of high to medium boiling range, such as diesel oil or kerosene, coal tar oil and oil of vegetable or animal origin, as well as hydrocarbons, for example alkylated naphthalenes or tetrahydronaphthalene, optionally using xylene mixtures, cyclohexanols, ketones and also chlorinated hydrocarbons, such as trichlorethane, trichlorethylene or trichlorobenzenes and tetrachlorobenzenes. Advangageously, organic solvents of boiling point above 100°C are used.

Aqueous application forms are particularly appropriately prepared from emulsion concentrates, pastes or wettable spraying powders by adding water. Possible emulsifiers or dispersing agents are non-ionic products, for example condensation products of aliphatic alcohols, amines or carboxylic acids, having a long-chain hydrocarbon radical of about 10 to 20 carbon atoms, with ethylene oxide, for example the condensation product of octadecyl alcohol and 25 to 30 mols of ethylene oxide, or that of technical oleylamine and 15 mols of ethylene oxide or that of dodecylmercaptan and 12 mols of ethylene oxide. As anionic emulsifiers there may be mentioned: the sodium salt of dodecyl alcohol sulphuric acid ester, the sodium salt of dodecyl benzenesulphonic acid, the potassium or triethanolamine salt of oleic acid or of abietic acid or of mixtures of these acids, or the sodium salt of a petroleum-sulphonic acid. Possible cationic dispersing agents are quaternary ammonium compounds, such as cetylpyridinium bromide, or dihydroxyethylbenzyldodecylammonium chloride.

Talc, kaolin, bentonite, calcium carbonate and calcium phosphate, but also charcoal, cork powder, wood flour and other materials of vegetable origin, can be employed for the manufacture of dusting agents and sprinkling agents.

Granules can be manufactured very simply by dissolving an active substance of formula (I) in an organic solvent and applying the solution thus obtained to a granular mineral, for example attapulgite, $SiO_2$, granicalcium, bentonite and the like, and then again evaporating the organic solvent.

Polymer granules can also be used. They can be manufactured by mixing the active substances of formula I with polymerisable compounds (urea/formaldehyde, dicyandiamide/formaldehyde, melamine/formaldehyde or others), after which a polymerisation is carried out under mild conditions, which leaves the active substances unaffected, with the granulation being carried out whilst the gel formation is still proceeding. It is more advantageous to impregnate finished porous polymer granules (urea/formaldehyde, polyacrylonitrile, polyesters or others) having a particular surface and an advantageous predeterminable adsorption/desorption ratiom with the active substances, for example in the form of their solutions (in a low-boiling solvent) and to remove the solvent. Such polymer granules can, in the form of micro-granules of bulk densities of preferably 300 g/litre to 600 g/litre, also be applied with the aid of atomisers. Atomising can be carried out over large areas of crop plant cultures by means of aircraft.

Of course pesticides, fertilisers, surface-active agents or substances for increasing the specific gravity, such as $BaSO_4$, can be added to the granules.

Granules are also obtainable by compacting the carrier material with the active substances and additives, and subsequent comminution.

The various use forms can, in the usual manner, be provided with additions of substances which improve the distribution, the adhesion, the rain resistance or the penetrating power; fatty acids, resins, glue, caesin, or alginates may be mentioned as such substances.

In general, the agents contain between 0.01 and 95 per cent by weight of active substance, preferably 0.1 to 80 per cent by weight. In certain special fields of use, for example in the case of applications by aircraft, technically pure active substance can also be employed and sprayed.

To broaden the spectrum of action, the active substances of formula I can be combined with known insecticidal, acaricidal and/or nematocidal active substances, of which the following may for example be mentioned:

PHOSPHORIC ACID DERIVATIVES
Bis-O,O-diethylphosphoric acid anhydride (TEPP)
O,O,O,O-Tetrapropyldithiopyrophosphate
Dimethyl(2,2,2-trichloro-1-hydroxyethyl)phosphonate (TRICHRORFON)
1,2-Dibromo-2,2-dichlorethyldimethylphosphate (NALED)
2,2-Dichlorovinyldimethylphosphate (DICHLORFOS)
2-Methoxycarbamyl-1-methylvinyldimethylphosphate (MEVINPHOS)
Dimethyl-1-methyl-2-(methylcarbamoyl)vinylphosphate cis (MONOCROTOPHOS)
3-(Dimethoxyphosphinyloxy)-N-methyl-N-methoxy-cis-crotonamide
3-Dimethoxyphosphinyloxy)-N,N-dimethyl-cis-crotonamide (DICROTOPHOS)
2-Chloro-2-diethylcarbamoyl-1-methylvinyldimethyl-phosphate (PHOSPHAMIDON)
O,O-Diethyl-O-2-(ethylthio)-ethylthiophosphate (DEMETON)
O,O-diethyl-S-2-(ethylthio)-ethylthiophosphate
S-Ethylthioethyl-O,O-dimethyl-dithiophosphate (THIOMETON)
O,O-Diethyl-S-ethylmercaptomethyldithiophosphate (PHORATE)
O,O-Diethyl-S-2[(ethylthio)ethyl]dithiophosphate (DISULFOTON)
O,O-Dimethyl-S-2-(ethylsulphinyl)ethylthiophosphate (OXYDEMETONMETHYL)
O,O-Dimethyl-S-(1,2 -dicarbethoxyethyl)dithiophosphate (MALATHION)
(O,O,O,O-Tetraethyl-S,S'-methylene-bis-[dithiophosphate] (ETHION)
O-Ethyl-S,S-dipropyldithiophosphate
O,O-Dimethyl-S-(N-methyl-N-formylcarbamoylmethyl)-dithiophosphate (FORMOTION)
O,O-Dimethyl-S-(N-methylcarbamoylmethyl)dithiophosphate (DIMETHAT)
O,O-Dimethyl-S-(N-ethylcarbamoylmethyl)dithiophosphate (ETHOATMETHYL)

O,O-Diethyl-S-(N-isopropylcarbamoylmethyl)-dithiophosphate (PROTHOAT)
S-N-(1Cyano-1-methylethyl)carbamoylmethyldiethyl-thiolphosphate (CYANTHOAT)
S-(2-Acetamidoethyl)-O,O-dimethyldithiophosphate
Hexamethylphosphoric acid triamide (HEMPA)
O,O-Dimethyl-O-p-nitrophenylthiaphosphate (PARATHION-METHYL)
O,O-Diethyl-O-p-nitrophenylthiophosphate (PARATHION)
O-Ethyl-O-p-nitrophenylthiphosphonate (EPN)
O,O-Dimethyl-O-(4-nitro-m-tolyl)thiophosphate (FENITROTHION)
O,O-Dimethyl-O-(2-chloro-4-nitrophenyl)thiophosphate (DICAPTHON)
O,O-Dimethyl-O-p-cyanophenylthiophosphate (CYANOX)
O-Ethyl-O-p-cyanophenylphenylthiophosphonate
O,O-Diethyl-O-2,4-dichlorophenylthiophosphate (DICHROFENTHION)
O-2,4-Dichlorophenyl-O-methylisopropylamidothiophosphate
O,O-Dimethyl-O-2,4,5-trichlorophenylthiophosphate (RONNEL)
O-Ethyl-O-2,4,5-trichlorophenylethylthiophosphonate (TRICHLORONAT)
O,O-Dimethyl-O-2,5-dichloro-4-bromophenylthiophosphate (BROMOPHOS)
O,O-Diethyl-O-2,5-dichloro-4-bromophenylthiophosphate (BROMOPHOS-ETHYL)
O,O-Dimethyl-O-(2,5-dichlor-4-iodophenyl)-thiophosphate (IODOFENPHOS)
4-tert. Butyl-2-chlorophenyl-N-methyl-O-methylamidophosphate (CRUFOMAT)
(Dimethyl-p-(methylthio)phenylphosphate
O,O-Dimethyl-O-(3-methyl-4-methylmercaptophenyl)thiophosphate (FENTHION)
Isopropylamino-O-ethyl-O-(4Methylmercapto-3-methylphenyl)-phosphate
O,O-Diethyl-O-p-[(methylsulphinyl)phenyl]-thiophosphate (FENSULFOTHION)
O,O-Dimethyl-O-p-sulphamidophenylthiophosphate
O-[p-(Dimethylsulphamido)phenyl]O,O-dimethylthiophosphate (FAMPHUR)
O,O,O',O'-Tetramethyl-O,O'-thiodi-p-phenylenethiophosphate
O-(p-(p-Chlorophenylazophenyl)O,O-dimethylthiophosphate (AZOTHOAT)
O-Ethyl-S-phenyl-ethyldithiophosphonate
O-Ethyl-S-4-chlorophenyl-ethyldithiophosphonate
O-Isobutyl-S-p-chlorophenyl-ethyldithiophosphate
O,O-Dimethyl-S-p-chlorophenylthiophosphonate
O,O-Dimethyl-S-(p-chlorophenylthiomethyl)-dithiophosphate
O,O-Diethyl-p-chlorophenylmercaptomethyl-dithiophosphate (CARBOPHENOTHION)
O,O-Diethyl-S-p-chlorophenylthiomethyl-thiophosphate
O,O-Dimethyl-S-(carbethoxy-phenylmethyl)dithiophosphate (PHENOTHOAT)
O,O-Diethyl-S-(carbofluorethoxy-phenylmethyl)-dithiophosphate
O,O-Dimethyl-S-(carbisopropoxy-phenylmethyl)-dithiophosphate
O,O-Dimethyl-O-(alpha-methylbenzyl-3-hydroxy-crotonyl)phosphate,
2-Chloro-1-(2,4-dichlorophenyl)vinyl-diethylphosphate (CHLORFENVINPHOS)
2-Chloro-1-(2,4,5-trichlorophenyl)vinyl-dimethylphosphate
O-(2-Chloro-1-(2,5-dichlorophenyl)vinyl)-0,0-diethyl-thiophosphate
Phenylglyoxylonitriloxime-O,O-diethylthiophosphate (PHOXIM)
O,O-Diethyl-O-(3-chloro-4-methyl-2-oxo-2-H-1-benzopyran-7-yl)-thiophosphate (COUMAPHOS)
O,O-Diethyl-7-hydroxy-3,4-tetramethylene-coumarinyl-thiophosphate (COUMITHOAT)
2,3-p-Dioxanedithiol-S,S-bis(O,O-diethyldithiophosphate) (DIOXATHION)
2-Methoxy-4-H-1,3,2-benzodioxaphosphorine-2-sulphide
O,O-Diethyl-O-(5-phenyl-3-isooxyzolyl (sic)) thiophosphate
S-[(6-Chloro-2-oxo-3-benzoxazolinyl)methyl]O,O-diethyldithiophosphate (PHOSALON)
2-diethoxyphosphinylimino)-4-methyl-2,3-dithiolane
O,O-Dimethyl-S-[2-methoxy-1,3,4-thiadiazol-5-(4H)-onyl-(4)-methyl]dithiophosphate
Tris-(2-methyl-1-aziridinyl)-phosphine-oxide (METEPA)
O,O-Dimethyl-S-phthalimidomethyl-dithiophosphate
S-(2-Chloro-1-phthalimidoethyl)-O,O-diethyldithiophosphate
N-Hydroxynaphthalimido-diethylphosphate
Dimethyl-3,5,6-trichloro-2-pyridylphosphate
O,O-Dimethyl-O-(3,5,6-trichloro-2-pyridyl)thiophosphate
O,O-Diethyl-O-(3,5,6-trichloro-2-pyridyl)thiophosphate
O,O-Diethyl-O-2-pyrazinylthiophosphate (THIONAZIN)
0,0-Diethyl-0-(2-isopropyl-4-methyl-6-pyrimidyl)thiophosphate (DIAZINON)
0,0-Diethyl-0-(2-quinoxylyl)thiophosphate
0,0-Dimethyl-S-(4-oxo-1,2,3-benzotriazin-3(4H)-ylmethyl)-diethiophosphate (AZINPHOSMETHYL)
0,0-Diethyl-S-(4-oxo-1,2,3-benzotriazin-3*4H)-ylmethyl)-dithiophosphate (azinphosethyl)
S-[(4,6-Diamino-s-triazin-2-yl)methyl]-0,0-dimethyldithiophosphate (MENAZON)
S-[2-(Ethylsulphonyl)ethyl]dimethylthiolphosphate (DIOXYDEMETON-S-METHYL)
Diethyl-S-[2-(ethylsulphinyl)ethyl]dithiophosphate (OXYDISULFOTON)
Bis-Bis-O,O-diethylthiophosphoric acid anhydride (SULFOTEP)
Dimethyl-1,3-di(carbomethoxy)-1-propen-2-yl-phosphate
Dimethyl-(2,2,2-trichloro-1-butyroyloxyethyl)phosphonate (BUTONAT)
0,0-Dimethyl-0-(2,2-dichloro-1-methoxyvinyl)phosphate
0,0-Dimethyl-0-(3-chloro-4-nitrophenyl)thiophosphate (CHLORTHION)
0,0-Dimethyl-0(or S)-2-(ethylthioethyl)thiophosphate (DEMETONS-METHYL)
Bis-(dimethylamido)fluorophosphate (DIMEFOX)
2-(0,0O,O-Dimethyl-phosphoryl-thiomethyl)5-methoxy-pyrone-4
3,4-Dichlorobenzyl-triphenylphosphonium chloride
Dimethyl-N-methoxymethylcarbamoylmethyl-dithiphosphate (FORMOCARBAM)
O-Diethyl-0-(2,2-dichloro-1-chlorethoxyvinyl)phosphate O,O-Dimethyl-0-(2,2-dichloro-1-chlorethoxyvinyl)-phosphate
O-Ethyl-S,S-diphenyldithiolphosphate
OO-Ethyl-S-benzyl-phenyldithiophosphonate
O,O-Diethyl-S-benzyl-thiolphosphate
O,O-Dimethyl-S-(4-chlorophenylthiomethyl)dithiophosphate (METHYLCARBOPHENOTHION)
O,O-Dimethyl-S-(ethylthiomethyl)diethiophosphate
Diisopropylaminofluorophosphate (MIPAFOX)
O,O-Dimethyl-S-(morpholinylcarbamylmethyl)dithiophosphate (MORPHOTHION)
Bismethylamido-phenylphosphate
O,O-Dimethyl-S-(benzenesulphonyl)dithiophosphate
O,O-Dimethyl-(S and O)-ethylsulphinylethylthiophosphate
O,O-Diethyl-0-4-nitrophenylphosphate
　O,O-Diethyl-S-(2,5-dichlorophenylthiomethyl)diethiophosphate (PHENDAPTON)
Triethoxy-isopropoxy-bis (thiophosphinyl)disulphide
O,O-Diethyl-0-(4-methyl-coumarinyl-7)-thiophosphate (POTASAN)
2-Methoxy-4H-1,3,2-benzodioxaphosphorine-2oxide
Octamethylphyrophosphoramide (SCHRADAN)
Bis(dimethoxythiophosphinylsulphido)-phenylmethane
5-Amino-bis(dimethylamido)phosphinyl-3-phenyl-1,2,4-triazole (TRIMAMIPHOS)
N-Methyl-5-(O,O-dimethylthiolphosphoryl)-3-thiavaleramide (VAMIDOTHION)

Carbamic Acid Derivatives

1-Naphthyl-N-methylcarbamate (CARBARYL)
2-Butinyl-4-chlorophenylcarbamate
4-Dimethylamine-3,5-xylyl-N-methylcarbamate
4-Dimethylamino-3-tolyl-N-methylcarbamate (AMINOCARB)
4-Methylthio-3,5-xylyl-N-methylcarbamate (METHIOCARB)
3,4,5-Trimethylphenyl-N-methylcarbamate
2-Chlorophenyl-N-methylcarbamate (CPMC)
5-Chlor-6-oxo-2-norbornane-carbonitrile-9-(methylcarbamoyl)-oxime
1-(Dimethylcarbamoyl)-5-methyl-3-pyrazolyl-N,N-dimethylcarbamate (DIMETILAN)
2,3-Dihydro-2,2,-dimethyl-7-benzofuranyl-N-methylcarbamate (CARBOFURAN)
2-Methyl-2-methylthio-propionaldehyde-0-(methylcabamoyl)-oxime (ALDICARB)
8-Quinaldy-N-methylcarbamate and its salts
Methyl 2-isopropyl-4-(methylcarbamoyloxy)carbanilate
m-(1-Ethylpropyl)phenyl-N-methylcarbamate
3,5-Di-tert.butyl-N-methylcarbamate
m-(1-Methylbutyl)phenyl-N-methylcarbamate
2-Isopropylphenyl-N-methylacrbamate
2-sec.Butylphenyl-N-methylcarbamate
m-Tolyl-N-methylcarbamate
2,3-Xylyl-N-methylcarbamate
3-Isopropylphenyl-N-methylcarbamate
3-tert.Butylphenyl-N-methylcarbamate
3-sec.-Butylphenyl-N-methylcarbamate
3-Isopropyl-5-methylphenyl-N-methylcarbamate (PROMECARB)
3,5-Diisopropylphenyl-N-methylcarbamate
2-Chlor-5-isopropylphenyl-N-methylcarbamate
2-Chlor-4,5-dimethylphenyl-N-methylcarbamate
2-(1,3-Dioxolan-2-yl)phenyl-N-methylcarbamate (DIOXYCARB)
2-(4,5-Dimethyl-1,3-dioxolan-2-yl)phenyl-N-methylcarbamate
2-(1,3-Dioxan-2-yl)phenyl-N-methylcarbamate
2-(1,3-Dithiolan-2-yl)phenyl-N-methylcarbamate
2-(1,3-Dithiolan-2-yl)phenyl-N,N-dimethylcarbamate
2-Isopropoxyphenyl-N-methycarbamate (ARPROCARB)
2-(2-Propinyloxy)phenyl-N-methylcarbamate
2-(2-Propinyloxy)phenyl-N-methylcarbamate
3-(2-Propinyloxy)phenyl-N-methylcarbamate
2-Dimethylaminophenyl-N-methylcarbamate
2-Diallylaminopphenyl-N-methylcarbamate
4-Diallylamino-3,5-xylyl-N-methylcarbamate (ALLYXICARB)
4-Benzothienyl-N-methylcarbamate
2,3-Dihydro-2-methyl-7-benzofuranyl-N-methylcarbamate
3-Methyl-1-phenylpyrazol-5-yl-N,N-dimethylcarbamate
1-Isopropyl-3-methylpyrazol-5-yl-N,N-dimethylcarbamate (ISOLAN)
2-(N',N'-Dimethylcarbamoyl)-3-methylpyrazol-5-yl-N,N-dimethylcarbamate
2-Dimethylamino-5,6-dimethylpyrimidin-4-yl-N,N-dimethylcarbamate
3-Methyl-4-dimethylaminomethyleneiminophenyl-N-methylcarbamate
3-Dimethylamino-methyleneiminophenyl-N-methylcarbamate
1-Methylthio-ethylimino-N-methylcarbamate (METHOXYMYL)
2-Methylcarbamoyloxyimino-1,3-dithiolane
5-Methyl-2-methylcarbamoyloxyimino-1,3-oxathiolane
2-(1-Methoxy-2-propxy)phenyl-N-methylcarbamate
2-(1-Butin-3-yl-oxy)phenyl-N-methylcarbamate
3-Methyl-4-(dimethylamino-methylmercaptomethyleneimino) phenyl-N-methylcarbamate
1,3-Bis(carbamoylthio)-2-(N,N-dimethylamino)-propane hydrochloride
5,5-Dimethylhydroresorcinoldimethylcarbamate
2-[Propargylethylamino]-phenyl-N-methylcarbamate
2-[Proparglymethylamino]-phenyl-N-methylcarbamate
2-[Dipropargylamino]-phenyl-N-methylcarbamate
3-Methyl-4-[dipropargylamino]-phenyl-N-methylcarbamate
3,5-Dimethyl-4-[dipropargylamino]-phenyl-N-methylcarbamate
2-[Allyl-isopropylamino]-phenyl-N-methylcarbamate and
3-[Allyl-isopropylamino]-phenyl-N-methylcarbamate.

Chlorinated Hydrocarbons

γ-Hexachlorocyclohexane [Gammexane; Lindane; γ HCH]
1,2,4,5,6,7,8,8-Octachloro-3α,4,7,7α'-tetrahydro-4,7-methyleneindane [Chlordan]
1,4,5,6,7,8,8-Heptachloro-3α,4,7,7α-tetrahydro-4,7-methyleneindane [Heptachlor]
1,2,3,4,10,10-Hexachloro-1,4,4α,5,8,8α-hexahydro-endo-1,4-exo-5,8-dimethanonaphthalene [Aldrin]
1,2,3,4,10,10-Hexachlor-6,7-epoxy-1,4,4α,5,6,7,8,8α,9-octahydro-exo-1,4-endo-5,8-dimethanonaphthalene [Dieldrin] Endrin 6,7,8,9,10,10-Hexachloro-1,5,5α,6,9,9α-hexahydro-6,9-methano-2,3,4 benzo[e]-dioxa-thiepene-3-oxide [Endosulfan]
Chlorinated camphor [Toxaphen]
Decachloroctahydro-1,3,4-metheno-2H-cyclobuta[e d] pentalen 2-one
Dodecachloroctahydro-1,3,4-metheno-1H-cyclobuta[c d]pentalene [Mirex]
Ethyl-1,1α,3,3α,4,5,5α,5 , 6-decachloroctahydro-2-hydroxy-1,3,4-metheno-1H-cyclobuta[c d]pentalene-2- laevulinate
Bis(pentachloro-2,4-cyclopentadien-1-yl)
Dinoctone-o
1,1,1-Trichloro-2,2-bis(p-chlorophenyl)ether [DDT]
Dichlorodiphenyl-dichlorethane [TDE]
Di(p-chlorophenyl)-trichloromethylcarbinol [Dicofol]
Ethyl-4,4'-diechlorophenylglycollate [Chlorobenzylate]
Ethyl-4,4'-dibromobenzylate [Bromobenzylate]
Isopropyl-4,4'-dichlorobenzylate
1,1,1-Tirchloro-2,2bis-(p-methoxyphenyl)ethane [Methoxychlor]
Diethyl-diphenyl-dichlorethane
Decachloropentacyclo(3,3,2,0$^{2,6}$, 0$^{3,9}$, 0$^{7,10}$)decan-4-one [Chlordecon].

Nitrophenols and Derivatives 4,6-Dinitro-6-methylphenol Na salt [dinitrocresol]
Dinitrobutylphenol-2,2',2"triethanolamine salt
2-cyclohexyl-4,6-dinitrophehol [Dinex]
2-(1-Methylheptyl)-4,6-dinitrophenyl-crotanate [Dinocap]
2sec.-Butyl-4,6-dinitrophenyl-3-methyl-butenoate [Binapacryl9
2 sec.-Butyl-4,6-dinitrophenyl-cyclopropionate and 2 sec.-Butyl-4,6-dinitrophenyl-isopropyl-carbonate [Dinobuton]

Various Substances

Sabadilla
Rotenon
Cevadin
Veratridin
Ryania
Pyrethrin
3-Allyl-2-methyl-4-oxo-2-cyclopenten-1-yl-chrysanthemumate (Allethrin)
6-Chloropiperonyl-chrysanthemumate (Barthrin)
2,4-Dimethylbenzyl-chrysanthemumate (Dimethrin)
2,3,4,5-Tetrahydrophthalimidomethyl-chrysanthemumate
(5-Benzyl-3-furyl)-methyl-2,2-dimethyl-3-(2-methylpropyanyl)-cylcopropanecarboxylate
Nicotine
Bacillus thuringiensis Berliner
Dicyclohexylcarbodiimide
Diphenyldiimide [azobenzene (sic)]
4-Chlorobenzyl-4-chlorophenylsulphide [Chlorbensid]
Creosote oil
6-Methyl-2-oxo-1,3-dithiolo-[4,5- b]-quinoxaline [Quinomethionat]
(I)-3-(2-Furfuryl)-2-methyl-4-oxocyclopent-2-enyl(I)-(cis+trans)chrysanthemum-monocarboxylate [Furethrin]
2-Pivaloyl-indane-1,3-dione [Pindon]
2-Fluorethyl(4-bisphenyl)acetate
2-Fluror-N-methyl-N(1-naphthyl)-acetamide
Pentachlorophenol and salts
2,2,2-Trichloro-N-(pentachlorophenyl)-acetimidoyl chloride
N'-(4-Chloro-2-methylphenyl)-N,N-dimethylformamidine (Chlorphenamidine)
4-Chlorobenzyl-4-fluorophenyl-sulphide (Fluorobeneside)
5,6-Dichloro-1-phenoxycarboanyl-2-trifluoromethyl-benzi-
midazole (Fenozaflor)
Tricyclohexyl-tin hydroxide
2-Thiocyanatoethyl-lauric acid ester
β-Butoxy-β'-thiocyanatodiethyl-ether
Isobornyl-thiocyanatoacetate
p-Chlorophenyl-p-chlorobenzenesulphonate (Ovex)
2,4-Dichlorophenyl-benzenesulphonate
p-Chlorophenyl-benzenesulphonate (Fenson)
p-Chlorophenyl-2,4,5-trichlorophenylsulphone (Tetradifon)
p-Chlorophenyl-2,4,5-trichlorophenylsulphide (Tetrasul)
Methyl bromide
p-Chlorophenyl-phenylsulphone
p-Chlorobenzyl-p-chlorophenylsulphide (Chlorobenside)
4-Chlorophenyl-2,4,5-trichlorophenylazosulphide
2(p-tert.-Butylphenoxy-1-methyl-2-chlorethyl-sulphite
2(p-tert.-Butylphenoxy) cyclohexyl-2-propinyl-sulphite
4,4'-Dichloro-N-methylbenzenesulphonanilide
N-(2-Fluoro-1,1,2,2,-tetrachlorethylthio)-methanesulphonanilide
2-Thio-1,3-dithiolo.(4,5-6)quinoxaline (Thioquinox)
Chloromethyl-p-chlorophenylsulphone (lauseto (sic!) new)
1,3,6,8-Tetranitrocarbazole and
Prop-2-ynyl-(4-t-butylphenoxy)-cyclohexylsulphite (propargil).

The action of the phosphoric acid esters of the formula I according to the present invention, can be increased by synergistic agents. Suitable substances for this purpose are, for example, Sesamine, Sesamex, piperonyl cyclonene, piperonyl butoxide, piperonal bis [2-(2-butoxyethoxy)ethyl] acetate, sulphoxides, propyl isome, N-(2-ethylhexyl)-5-norbornene-2,3-dicarboxamide, octachlorodipropyl-ether, 2-nitrophenylpropargyl-ether, 4-chlor-2-nitrophenyl-propargyl-ether, and 2,4,5-trichlorophenyl-propargyl-ether.

The present invention also provides a process for the manufacture of the phosphoric acid esters of the formula I, which comprises reacting a dihalogenacetic acid ester of the formula

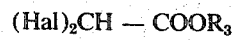

in which Hal represents a chlorine atom or a bromine atom and R$_3$ has the meaning specified above, with a trialkylphosphite of the formula

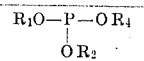

in which R$_1$ and R$_2$ have the meansings specified above and R$_4$ represents an alkyl radical having from 1 to 4 carbon atoms. The reaction can be carried out in a solvent, for example, toluene, xylene, petrol ether or dioxane, depending upon the speed or sluggishness of the particular reaction.

This reaction is surprising, since it is expressly stated in the literature (F. W. Lichtenthaler, Chem.Rev. 61, 612[1961]), in elaboration of the Perkow reaction, that the reaction of triethylphosphite with dichloracetic acid ethyl ester only yields undefined end products together with $C_2H_5Cl$. Dichloracetic acid esters, so it is said, are not suitable for the Perkow reaction.

The following Examples illustrate the invention.

EXAMPLE 1

O,O-diethyl-1-(4-chlorophenoxy)-2-chloro-vinyl-phosphate

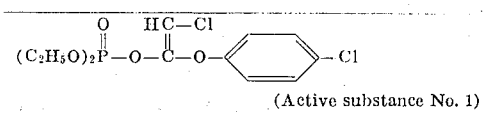

(Active substance No. 1)

47.6 g of dichloracetic acid 4-chlorophenyl ester were dissolved in 100 ml of toluene. 40 g of triethylphosphite were added to this solution, after which the reaction mixture was warmed to 110°c and kept at this temperature for 16 hours.

The toluene was subsequently distilled off and the crude product was purified by means of a molecular distillation apparatus.

Yield 35.3 g; boiling point: 100°C/0.003-0.004 mm Hg

Analysis for $C_{12}H_{15}Cl_2O_5P$

|  | Calculated | Found |
|---|---|---|
| %P | 9.1 | 8.9 |
| %Cl | 20.8 | 21.3 |

The structure of the product was confirmed by means of infrared analysis. On addition of $SO_2Cl_2$ in $CH_2Cl_2$, $Cl_2$ and added to the double bond. The resulting yellowish trichlorethyl phosphate shows the following analytical figurs for $C_{12}H_{15}Cl_4O_5P$:

|  | Calculated | Found |
|---|---|---|
| %P | 7.52 | 7.7 |
| %Cl | 34.42 | 34.9 |

The following phosphoric acid esters can be obtained in a similar manner:

| Active substance number | $R_1=R_2$ | Hal | $R_3$ | Boiling point/mm.Hg |
|---|---|---|---|---|
| 2 | $C_2H_5$ | Cl | —⌬—Cl (with Cl) | 100° C./0.0001 (molecular distillation). |
| 3 | $CH_3$ | Cl | —⌬—Cl | 124° C./0.005. |
| 4 | $CH_3$ | Cl | —⌬—Cl (with $CF_3$) | 130° C./0.001 (molecular distillation). |
| 5 | $CH_3$ | Cl | —⌬—$CF_3$ (with Cl) | 130° C./0.001 (molecular distillation). |
| 6 | $CH_3$ | Cl | —⌬—$NO_2$ (with $CH_3$) | 135° C./0.001 (molecular distillation). |
| 7 | $CH_3$ | Cl | —⌬—$NO_2$ (with Cl) | 135° C./0.001 (molecular distillation). |
| 8 | $C_2H_5$ | Cl | —⌬—Cl (with $CF_3$) | 135° C./0.001 (molecular distillation). |
| 9 | $C_2H_5$ | Cl | —⌬—$CF_3$ (with Cl) | 135° C./0.001 (molecular distillation). |
| 10 | $C_2H_5$ | Cl | —⌬—$NO_2$ (with $CH_3$) | 140° C./0.001 (molecular distillation). |
| 11 | $C_2H_5$ | Cl | —⌬—$NO_2$ (with Cl) | 130° C./0.001 (molecular distillation). |
| 12 | $C_2H_5$ | Cl | —⌬ | 110° C./0.003 (molecular distillation). |
| 13 | $C_2H_5$ | Cl | —⌬—Cl | 124–132° C./0.06. |
| 14 | $C_2H_5$ | Cl | —⌬ (with Cl) | 125° C./0.008. |
| 15 | $C_2H_5$ | Cl | —⌬—Cl (with Cl) | 130° C./0.02. |
| 16 | $C_2H_5$ | Cl | Cl—⌬ (with Cl) | 145° C./0.03. |
| 17 | $C_2H_5$ | Cl | Cl—⌬—Cl (with Cl) | 136° C./0.001 (molecular distillation). |
| 18 | $C_2H_5$ | Cl | Cl—⌬—I (with Cl) | Melting point: 90° C. |
| 19 | $C_2H_5$ | Cl | —⌬—Br | 123° C./0.001. |
| 20 | $C_2H_5$ | Cl | —⌬—Br (with Br) | 135° C./0.003 (molecular distillation). |
| 21 | $C_2H_5$ | Cl | —⌬—Cl (with $CH_3$) | 132–137° C./0.022. |
| 22 | $C_2H_5$ | Cl | —⌬—$CH_3$ | 115–118° C./0.008. |
| 23 | $C_2H_5$ | Cl | —⌬—$SCH_3$ (with $CH_3$) | Cannot be distilled. |

| Active substance number | $R_1=R_2$ | Hal | $R_3$ | Boiling point/mm.Hg |
|---|---|---|---|---|
| 24 | $C_2H_5$ | Cl | 4-($SCH_3$)-phenyl | Do. |
| 25 | $C_2H_5$ | Cl | 4-($NO_2$)-phenyl | Do. |
| 26 | $C_2H_5$ | Cl | 2-($CF_3$)-phenyl | 130° C./0.002 (molecular distillation). |
| 27 | $C_2H_5$ | Cl | 4-($CH_3$)-phenyl | 124° C./0.015. |
| 28 | $C_2H_5$ | Cl | 3-($CH_3$)-phenyl | 130° C./0.02. |
| 29 | $C_2H_5$ | Cl | 3-($OCH_3$)-phenyl | 145–152° C./0.03. |
| 30 | $C_2H_5$ | Cl | 4-($OCH_3$)-phenyl | 137–145° C./0.05. |
| 31 | $C_2H_5$ | Cl | 2-($OCH_3$)-phenyl | 165° C./0.02. |
| 32 | $C_2H_5$ | Cl | 2-Cl-5-$CH_3$-phenyl | 142° C./0.015. |
| 33 | $C_2H_5$ | Cl | naphthyl | 140° C./0.001 (molecular distillation). |
| 34 | $C_2H_5$ | Cl | 3-$C(CH_3)_3$-phenyl | 116° C./0.01. |
| 35 | $C_2H_5$ | Cl | 4-($COOCH_3$)-phenyl | 140° C./0.02. |
| 36 | $C_2H_5$ | Cl | 2-($COOCH_3$)-phenyl | 135–140° C./0.02 |
| 37 | $CH_3$ | Cl | 2,4-$Cl_2$-phenyl | 126° C./0.02. |
| 38 | $CH_3$ | Cl | 2,4,5-$Cl_3$-phenyl | 150° C./0.03. |
| 39 | $CH_3$ | Cl | 2,4,5-$Cl_3$-phenyl | 130° C./0.001 (molecular distillation). |
| 40 | $CH_3$ | Cl | 2,4-$Cl_2$-phenyl | 122° C./0.02. |
| 41 | $C_2H_5$ | Cl | 2-($COOCH_3$)-phenyl | 130° C./0.02. |
| 42 | $C_2H_5$ | Cl | 4-(CN)-phenyl | 140° C./0.001 (molecular distillation). |
| 43 | $C_2H_5$ | Cl | 3,4-$Cl_2$-phenyl | 137° C./0.001 (molecular distillation). |
| 44 | $C_2H_5$ | Cl | 2,5-$Cl_2$-4-Br-phenyl | Melting point: 84° C. |
| 45 | $C_2H_5$ | Cl | 2,5-$(CH_3)_2$-3,6-$Cl_2$-phenyl | 135° C./0.001 (molecular distillation). |
| 46 | $C_2H_5$ | Cl | 2-$CH_3$-3,5-$Cl_2$-phenyl | 136° C./0.001 (molecular distillation). |
| 47 | $C_2H_5$ | Cl | 2-Cl-4-$NO_2$-phenyl | 130° C./0.001 (molecular distillation). |
| 48 | $C_2H_5$ | Cl | 2-$OCH_3$-4-Br-phenyl | 155° C./0.005 (molecular distillation). |
| 49 | $C_2H_5$ | Cl | 2-Br-4-Cl-phenyl | 135° C./0.005 (molecular distillation). |
| 50 | $C_2H_5$ | Cl | $-C_6Cl_5$ | 180° C./0.08 |
| 51 | $CH_3$ | Cl | 4-(CN)-phenyl | 125° C./0.001 (molecular distillation). |
| 52 | $C_2H_5$ | Cl | 2-$OCH_3$-3,4-$Br_2$-phenyl | 145° C./0.005 (molecular distillation). |
| 53 | $C_2H_5$ | Cl | 2,3,4-$Cl_3$-phenyl | 140° C./0.001 (molecular distillation). |
| 54 | $C_2H_5$ | Cl | 2-$NO_2$-4-Cl-phenyl | 140° C./0.005 (molecular distillation). |
| 55 | $C_2H_5$ | Cl | 4-($CO-CH_3$)-phenyl | 140° C./0.005 (molecular distillation). |
| 56 | $C_2H_5$ | Cl | 3-($CO-CH_3$)-phenyl | 140° C./0:005 (molecular distillation). |
| 57 | $C_2H_5$ | Cl | 2-($CO-CH_3$)-phenyl | 140° C./0.005 (molecular distillation). | as well as the compounds

| 58 | $(C_2H_5O)_2\overset{O}{\underset{\|}{P}}-O-\overset{HC-Br}{\underset{\|}{C}}-O-$(4-Cl-phenyl) | | | Boiling point$_{0.03}$ 142–146° C. (molecular distillation). |

| Active substance No. | $R_1=R_2$ | Hal | $R_3$ | Boiling point/mm. Hg |
|---|---|---|---|---|
| 59 | 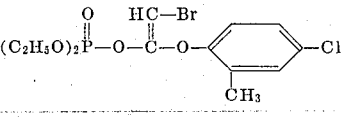 | | | Boiling point$_{0.02}$ 145–149° C. (molecular distillation). |
| 60 | 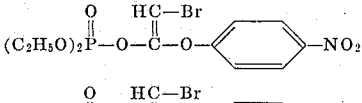 | | | Cannot be distilled. |
| 61 | 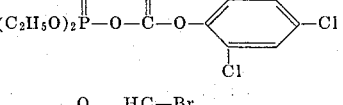 | | | Boiling point$_{0.02}$ 138° C. (molecular distillation). |
| 62 | 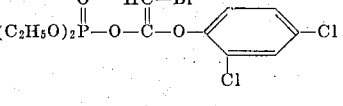 | | | Boiling point$_{0.001}$ 128° C. (molecular distillation). |
| 63 | 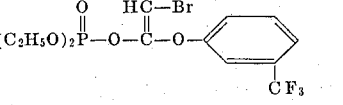 | | | Boiling point$_{0.02}$ 140–143° C. (molecular distillation). |
| 64 | 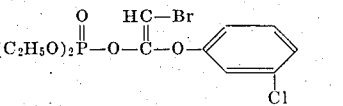 | | | Boiling point$_{0.02}$ 107–108° C. (molecular distillation). |
| 65 | 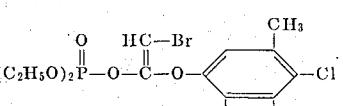 | | | Boiling point$_{0.02}$ 151° C. (molecular distillation). |
| 66 | 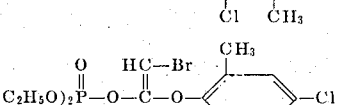 | | | Boiling point$_{0.001}$ 148–149° C. (molecular distillation). |
| 67 | 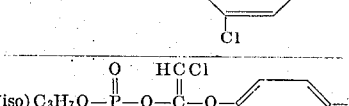 | | | Boiling point$_{0.01}$ 129° C. (molecular distillation). |
| 68 | 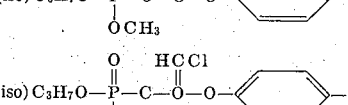 | | | Boiling point$_{0.01}$ 129° C. (molecular distillation). |

EXAMPLE 2 a. Dusting agents

Equal parts of an active substance according to the invention and of precipitated silica are finely ground. Dusting agents preferably containing 1–6 percent of active substance can be manufactured therefrom by mixing with kaolin or talc.

b. Spraying powders

In order to manufacture a spraying powder, the following components are for example mixed and finely ground:

50 parts of active substance according to the present invention 20 parts of Hisil (highly adsorbent silica)

25 parts of Bolus alba (kaolin)

3.5 parts of a reaction product of p-tert.octylphenol and ethylene oxide and 1.5 parts of sodium 1-benyl-2-stearyl-benzimidazole-6,3'-disulphonate.

c. Emulsion concentrate

Easily soluble active substances can also be formulated as an emulsion concentrate according to the following instruction:

20 parts 70 parts of xylene and 10 parts of a mixture of the reaction product of an alkyl phenol with ethylene oxide and calcium dodecylbenzene sulphonate are mixed. On dilution with water to the desired concentration, a sprayable emulsion is produced.

d. Granules a. 7.5 g of one of the active substances of formula I are dissolved in 100 ml of acetone and the acetone solution thus obtained is added to 92 g of granular attapulgite (mesh size: 24/48 meshes/inch). The whole is well mixed and the solvent is stripped off in a rotary evaporator. Granules containing 7.5 percent of active substance are obtained.

b. In order to manufacture 10 percent strength polymer granules, 1050 to 1100 g of technical active substance of formula I are dissolved in 2 litres of trichlorethylene and sprayed in a fluidised bed granulator, at 1.5 atmospheres gauge spraying pressure, onto 9,230 g of initially introduced porous urea/HCHO-granules. The solvent can again be removed by heating the fluidising air to approx. 50°C.

c. In order to manufacture 7.5 percent strength weighted granules, 770 g of a solid technical active substance of formula I, 500 g of BaSO$_4$, 1000 g of urea and 7730 g of pulverulent, porous polyacrylonitrile are pressed on a roll mill and subsequently crushed to the desired particle size.

EXAMPLE 3

Contact action on Musca domestica (L.) and Ceratitis capitata.

1 half of each of a series of Petri dishes was treated with 1 ml of an acetone solution of substance No. 1 containing 1000, 100, 10, 5, 2.5 and 1.25 ppm of the active substance. After evaporation of the solvent, 10 supercooled house flies were introduced into each of the prepared Petri dishes, and the lid halves were placed on top. After increasing time intervals, the destruction was checked at the various concentrations. The following destruction in per cent was achieved after 2 hours:

Active substance No. 1

| Concentration [ppm] | Musca domestica | Ceratitis capitata |
|---|---|---|
| 1000 | 100 | 100 |
| 100 | 100 | 100 |
| 10 | 100 | 100 |
| 5 | 50 | 100 |
| 2.5 | 50 | 100 |
| 1.25 | 0 | 50 |

EXAMPLE 4

Action against Spodoptera littoralis larvae 5 larvae at a time, in the L-2 stage, are placed on a leaf of Malva silvestris which originates from a plant dipped into an aqueouos solution of an active substance, and which had subsequently been introduced into a covered Petri dish. The atmospheric moisture in the dish is maintained with a moistened pad of cotton-wood. In this contact test and ingestion test the action was examined after 1 day and after 2 days. If complete destruction has already occurred after 1 day for a particular concentration, a fresh leaf of the same plant is infested with a new population. In this way a possible ageing of the active substances coating is also taken into account in the assessment.

For active substance No. 25, the following destruction percentages were found:

| Concentration [ppm] | 1 day | 2 days |
|---|---|---|
| 800 | 100 | 100 |
| 400 | 100 | 100 |
| 200 | 100 | 100 |
| 100 | 100 | 80 |
| 50 | 100 | 100 |
| 25 | 80 | 80 |

EXAMPLE 5 a. The test with Epilachna varivestis, the Mexican bean bug, was carried out as follows: 4–5 seedlings of Phaseolus vulgaria in the primary leaf stage, grown in a flower pot, were dipped into emulsions of the experimental preparations and subsequently allowed to dry. The experimental animals, L-4 stage of the beetle, were introduced into a cellophane bag which was subsequently fixed over the treated plant by means of a rubber band. After 5 days, the action of the treatment was determined by counting the live and deaf animals and by calculating the percentage destruction.

For active substance No. 43 the following percentages of destruction were found:

| Concentration [ppm] | 5 days |
|---|---|
| 800 | 100 |
| 400 | 100 |
| 200 | 100 |
| 100 | 100 |
| 50 | 100 |
| 25 | 100 | b. The test with Orgyia conostigma in the L-3 stage was carried out analogously with young mallows (Malva silvestris) as the host plant. 5 larvae wwere used for each experiment. The results were assessed after 2 and 5 days. If complete destruction had already occurred after 2 days, the plant was again infested. In this way a possible ageing of the active substance coating is also taken into account in the assessment.

For active substance No. 21 the following percentages of destruction were achieved:

| Concentration [ppm] | 2 days | 5 days |
|---|---|---|
| 800 | 100 | 100 |
| 400 | 100 | 80 |
| 200 | 100 | 100 |
| 100 | 100 | 80 |

EXAMPLE 6

Action against Chilo suppressalis (larvae)

Active substances No. 1 and 2 were tested for their ingestion action against L-2 larvae. For this test, the larvae were placed on the root structure of rice seedlings which had previously been treated by dipping in an emulsion of the active substance.

The evaluation took place after 5 days.

| Concentration of the active substance in the emulsion | Mortality in % for active substance No. 1 and No. 2 |
|---|---|
| 800 ppm | 100 |
| 400 ppm | 100 |
| 200 ppm | 100 |

EXAMPLE 7

Action against *Aphis fabae*

Young Vicia faba plants approx 6 cm high were infested with parts of plants attached by Alphis fabae. After 5 days the starting conditions for the active substance test were present, as a result of the further growth of the plants and approximately strong multiplication of the aphids. The attacked plants were sprayed with the emulsions of active substance No. 25 from all sides (contact action), or only from above in the direction of the shoot axis (penetration action). In the latter case, the experimental animals sitting on the undersides of the leaves were not struck by the spray jet. If 100 percent destruction had already occurred after 2 days, the plants were re-infested.

Active substance No. 25 achieved the following percentages of destruction after 2 and 5 days:

| Concentration [ppm] | Contact action 2 days | Contact action 5 days | Penetration 2 days |
|---|---|---|---|
| 800 | 100 | 100 | 100 |
| 400 | 100 | 0 | 100 |
| 200 | 100 | 0 | 100 |
| 100 | 100 | 0 | 60 |

EXAMPLE 8

Action against spider mites

Busch bean plants (Phaseolus vulgaris) in the two-leaf stage were infested with spider mites, 12 hours before the treatment with the active aubstances, by placing attacked pieces of leaf from a culture on them, so that after the end of this time a population in all stages of development was present on the plant. The plants were then sprayed with the emulsified active substance by means of a chromatography atomiser, until a uniform deposit of droplets was produced on the surface of the leaf. The results were assessed after 2 and 7 days; the parts of the plant were inspected under a stereomicroscope in order to calculate the percentages of destruction. The action on eggs was not yet detectable after 2 days with this exerimental arrangement, because the embryo development takes 4 days under the particular conditions. If after 2 days there was 100 percent destruction of larvae and adults, the plant was re-infested.

The percentages of destruction of the normally sensitive variety tetranchus urticae Koch and of the phosphoric acid ester-tolerant variety Tetranychus telarious L, are given in the Table below.

Active substance No. 1 a. Action against Tetr. urticae

Destruction

| Concentration ppm | after 2 days larvae | after 2 days adults | eggs | after 7 days larvae | after 7 days adults |
|---|---|---|---|---|---|
| 800 | 100 | 100 | 80 | 100 | 100 |
| 400 | 100 | 100 | 60 | 100 | 100 |
| 200 | 100 | 100 | 0 | 80 | 100 |
| 100 | 100 | 100 | 0 | 0 | 80 | b. Action against Tetr. telarius

Destruction

| Concentration [ppm] | after 2 days larvae | after 2 days adults | eggs | after 7 days larvae | after 7 days adults |
|---|---|---|---|---|---|
| 800 | 100 | 100 | 60 | 100 | 100 |
| 400 | 100 | 100 | 60 | 100 | 100 |
| 200 | 100 | 100 | 0 | 80 | 100 |
| 100 | 100 | 80 | 0 | 0 | 80 |

Active substance No. 15 a. Action against Tetr. urticae

Destruction

| Concentration [ppm] | after 2 days | | | after 7 days | |
|---|---|---|---|---|---|
| | larvae | adults | eggs | larvae | adults |
| 800 | 100 | 100 | 100 | 100 | 100 |
| 400 | 100 | 100 | 100 | 100 | 100 |
| 200 | 100 | 100 | 60 | 100 | 100 |
| 100 | 100 | 100 | 0 | 80 | 100 | b. Action against Tetr. telarius

Destruction

| Concentration [ppm] | after 2 days | | | after 7 days | |
|---|---|---|---|---|---|
| | larvae | adults | eggs | larvae | adults |
| 800 | 100 | 100 | 100 | 100 | 100 |
| 400 | 100 | 100 | 80 | 100 | 100 |
| 200 | 100 | 80 | 0 | 100 | 100 |
| 100 | 80 | 80 | 0 | 60 | 100 |

EXAMPLE 9

Action against ectoparasites and vectors

Ticks

A. Rhipicephalus bursa (adults). The experimental animals were briefly treated with aqueous solutions of a dilution series of the active substance. Assessment after 2 weeks.

b. Rhipicephalus bursa (larvae). Method as under A). Assessment after 3 days.

C. Boophilus microplus (larvae). Method as under B). Assessment after 3 days.

Vectors

D. Lucilia sericata (larvae). Chopped horsemeat, mixed with dilution concentrations of an active substance, were administered as food to the larvae of the blow-fly. Assessment after 24 hours.

E. Aëdes Aegypti (larvae). The larvae of the yellow fever mosquito were kept in a very dilute aqueous solution of active substance. Assessment after 24 hours.

Minimum concentrations for complete destruction:

| Active substance No. | A ppm | B ppm | C ppm | D ppm | E ppm |
|---|---|---|---|---|---|
| 1 | 0.5 | 0.1 | 0.1 | 0.1 | 0.003 |
| 2 | 10 | 0.5 | 0.1 | 1.5 | 0.001 |
| 3 | 10 | 10 | 1 | 6 | 0.125 |
| 10 | 50 | 10 | 10 | 6 | 0.06 |
| 13 | 5 | 0.1 | 0.1 | 1.5 | 0.01 |
| 14 | 10 | 1 | 0.5 | 3 | 0.001 |
| 16 | 10 | 0.1 | 0.1 | 1.5 | 0.012 |
| 17 | 50 | 1 | 0.5 | 3 | 0.025 |
| 18 | 100 | 1 | 50 | 12 | 0.05 |
| 19 | 5 | 0.1 | 0.1 | 3 | 0.001 |
| 20 | 10 | 0.1 | 0.1 | 3 | 0.03 |
| 21 | 1 | 0.1 | 0.1 | 3 | 0.025 |
| 23 | 100 | 10 | 5 | 12 | 0.125 |

Minimum concentration for complete destruction:

| Active substance No. | A ppm | B ppm | C ppm | D ppm | E ppm |
|---|---|---|---|---|---|
| 25 | 10 | 10 | 10 | 0.75 | 0.012 |
| 26 | 1 | 0.1 | 0.1 | 3 | 0.05 |
| 27 | 10 | 0.1 | 0.1 | 3 | 0.006 |
| 28 | 5 | 1 | 0.5 | 3 | 0.012 |
| 29 | 5 | 5 | 5 | 3 | 0.012 |
| 30 | 10 | 10 | 5 | 3 | 0.025 |
| 31 | 10 | 1 | 1 | 3 | 0.012 |
| 33 | 10 | 0.1 | 1 | 6 | 0.125 |
| 34 | 10 | 0.5 | 1 | 12 | 1 |
| 35 | 100 | 10 | 5 | 3 | 0.05 |
| 36 | 10 | 10 | 10 | 3 | 0.25 |
| 37 | 50 | 1 | 1 | 1.5 | 0.001 |
| 38 | 10 | 1 | 1 | 1.5 | 0.012 |
| 39 | 10 | 10 | 5 | 1.5 | 0.005 |
| 40 | 10 | 10 | 1 | 1.5 | 0.01 |
| 41 | 10 | 10 | 10 | 3 | 0.025 |
| 42 | 10 | 1 | 5 | 1.5 | 0.002 |
| 43 | 10 | 0.1 | 0.1 | 1.5 | 0.005 |
| 44 | 100 | 0.1 | 0.1 | 3 | 0.25 |
| 45 | 1 | 0.1 | 0.1 | 48 | 0.1 |
| 46 | 1 | 0.1 | 0.1 | 3 | 0.025 |
| 47 | 100 | 10 | 10 | 3 | 0.025 |
| 48 | 10 | 1 | 1 | 6 | 0.2 |
| 49 | 5 | 0.1 | 0.1 | 2 | 0.25 |
| 50 | 100 | 1 | 1 | 48 | 0.1 |
| 51 | 50 | 100 | 100 | 6 | 0.05 |
| 52 | 50 | 1 | 1 | 12 | 0.01 |
| 53 | 10 | 0.1 | 0.1 | 6 | 0.1 |

Minimum conceneration for complete destruction:

| Active substance No. | A [ppm] | B [ppm] | C [ppm] | D [ppm] | E [ppm] |
|---|---|---|---|---|---|
| 54 | 100 | 10 | 50 | 4 | 1 |
| 55 | 10 | 10 | 10 | 4 | 0.5 |
| 56 | 10 | 10 | 10 | 12 | 1 |

EXAMPLE 10

Action against storage pests when using a 5 percent strength dust formulation based on talc.

| Varieties of test animal | Minimum amount of active substance for 100 % destruction in 24 hours' exposure time (mg of active substance per m$^2$) Compound No. 37 |
|---|---|
| German cockroach (Phyllodromia germanica) | 12 |
| American cockroach (Periplaneta americana) | 50 |
| Russian cockroach (Blatta orientalis) | 50 |
| Flour weevil imago (Tenebrio molitor) larva | 50 / 100 |
| Bacon weevil imago (Dermestes frischii) | 50 |
| larva | 12 |
| Sitophilus granarius (larva) | 50 |
| Fur weevil larva (Attagenus piceus) | 50 |
| House cricket (Acheta domestica) | 100 |

EXAMPLE 11

Fungicidal Action

1. Rice plants were grown in a greenhouse and sprayed once, propylactically, with an aqueous spraying liquor containing 0.1 percent of the active substances No. 21. Two days thereafter, the plants were treated in this way were infected with conidia of *Piricularia oryzae* Bri. and Cav. After 7 days incubation in a humidity chamber, the plants treated with the experimental preparation showed a fungal attack of about 10 percent, whilst the untreated control plants were 100 percent attacked.

2. Small agar plates on which Rhizoctonia solani Kühn had grown were covered, in Petri dishes, with non-sterile soil. An aqueous liquor containing active substancec No. 38 which was to be tested, was uniformly distributed over the surface of these layers of soil. After an incubation time of 48 hours at 24°C the growth of the test fungus was examined and assessed. Herein, a test concentration of 100 ppm of active substance showed complete inhibition of fungal growth.

We claim:

1. A pesticidal composition useful for combating pests selected from the group consisting of insects and acarinae comprising (1) a pesticidally effective amount of a compound of the formula

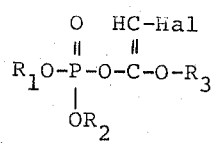

in which Hal represents chlorine or bromine; each of $R_1$ and $R_2$ represents alkyl of from 1 to 4 carbon atoms; and $R_3$ represents phenyl, naphthyl or phenyl substituted by from 1 to 5 substituents selected from the group consisting of halogen, alkyl of from 1 to 4 carbon atoms, alkoxy of from 1 to 4 carbon atoms, alkylthio of from 1 to 4 carbon atoms, nitro, trifluoromethyl, cyano, the group —COO-alkyl in which the alkyl group has from 1 to 4 carbon atoms and the group —CO-alkyl in which the alkyl has from 1 to 4 carbon atoms and (2) a suitable carrier.

2. The composition according to claim 1 in which, in the compound, each of $R_1$ and $R_2$ represents methyl or ethyl; and $R_3$ represents phenyl or phenyl substituted by from 1 to 5 substituents selected from the group consisting of halogen, methyl, ethyl, methoxy, ethoxy, methylmercapto, nitro, trifluoromethyl, carbethoxy, carbomethoxy, acetyl or propionyl.

3. The composition according to claim 2 in which, in the compound Hal represents chlorine; and $R_3$ represents phenyl substituted by one methyl or ethyl group or by from 1 to 5 substituents selected from the group consisting of chlorine, bromine, iodine, cyano, nitro or trifluoromethyl.

4. A method for combatting pests selected from the group consisting of insects, and acarinae, which comprises applying to said pests a pesticidally effective amount of a compound of the formula

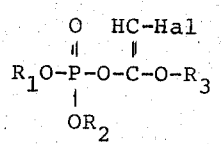

in which Hal represents chlorine or bromine; each of $R_1$ and $R_2$ represents alkyl of from 1 to 4 carbon atoms; and $R_3$ represents phenyl, naphthyl or phenyl substituted by from 1 to 5 substituents selected from the group consisting of halogen, alkyl of from 1 to 4 carbon atoms, alkoxy of from 1 to 4 carbon atoms, alkylthio of from 1 to 4 carbon atoms, nitro, trifluoromethyl, cyano, the group —COO-alkyl in which the alkyl group has from 1 to 4 carbon atoms and the group —CO-alkyl in which the alkyl has from 1 to 4 carbon atoms.

5. The method according to claim 4 in which, in the compound, each of $R_1$ and $R_2$ represents methyl or ethyl; and $R_3$ represents phenyl or phenyl substituted by from 1 to 5 substituents selected from the group consisting of halogen, methyl, ethyl, methoxy, ethoxy, ethylmercapto, nitro, trifluoromethyl, carbethoxy, carbomethoxy, acetyl or propionyl.

6. The method according to claim 5 in which, in the compound Hal represents chlorine; and $R_3$ represents phenyl substituted by one methyl or ethyl group or by from 1 to 5 substituents selected from the group consisting of chlorine, bromine, iodine, cyano, nitro or trifluoromethyl.

7. The method of claim 6 in which the compound is of the formula

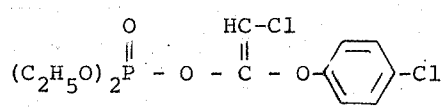

8. The method of claim 6 in which the compound is of the formula

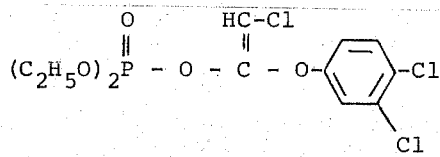

9. The method of claim 6 in which the compound is of the formula

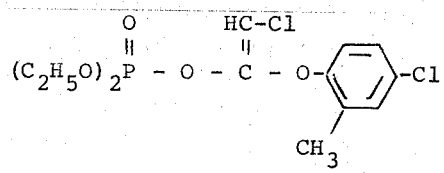

10. The method of claim 6 in which the compound is of the formula

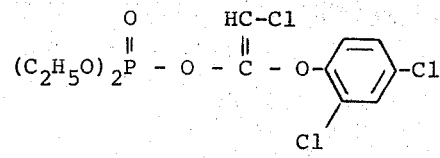

11. The method of claim 6 in which the compound is of the formula

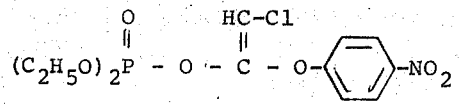

12. The method of claim 6 in which the compound is of the formula

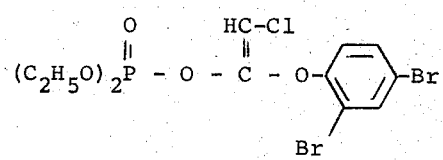

13. The method of claim 6 in which the compound is of the formula

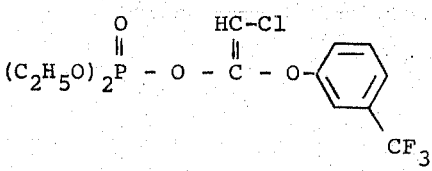

14. The method of claim 6 in which the compound is of the formula

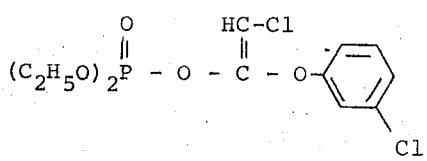

15. The method of claim 6 in which the compound is of the formula

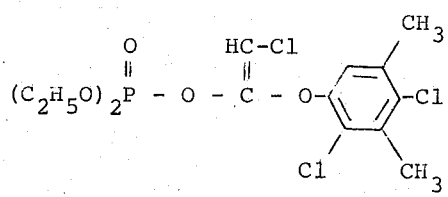

16. The method of claim 6 in which the compound is of the formula

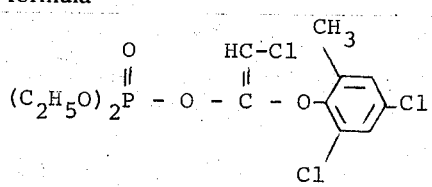

17. The method of claim 6 in which the compound is of the formula

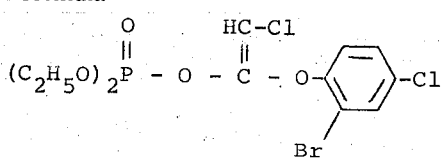

18. The method of claim 5 in which the compound is of the formula

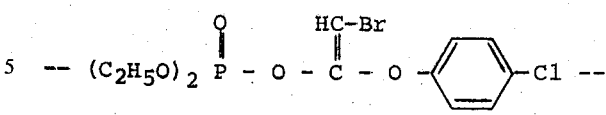

19. The method of claim 5 in which the compound is of the formula

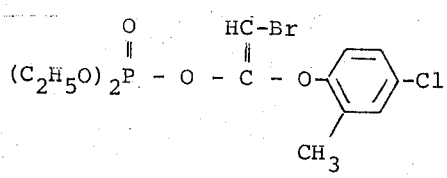

20. The method of claim 6 in which the compound is of the formula

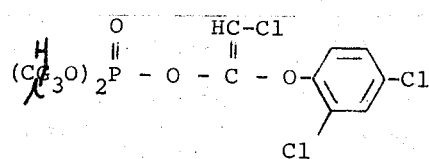

21. The method of claim 6 in which the compound is of the formula

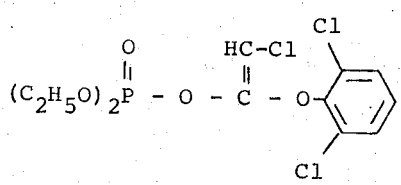

* * * * *

UNITED STATES PATENT OFFICE
CERTIFICATE OF CORRECTION

Patent No. 3,852,438            Dated December 3, 1974

Inventor(s) Henry Martin and Jozef Drabek

It is certified that error appears in the above-identified patent and that said Letters Patent are hereby corrected as shown below:

Column 1, line 7: delete "Ciba Limited" and in lieu thereof insert -- Ciba-Geigy AG --.

Signed and sealed this 4th day of March 1975.

(SEAL)
Attest:

RUTH C. MASON
Attesting Officer

C. MARSHALL DANN
Commissioner of Patents
and Trademarks